United States Patent [19]

Cummings et al.

[11] Patent Number: 5,037,905
[45] Date of Patent: Aug. 6, 1991

[54] PROCESS FOR REDUCING POLYMER BUILD-UP IN HEAT EXCHANGERS DURING POLYMERIZATION OF ALPHA-OLEFINS

[75] Inventors: Weldon C. Cummings; Reginald W. Geck, both of Victoria, Tex.; Fathi D. Hussein, Crosslanes, W. Va.

[73] Assignee: Union Carbide Chemicals and Plastics Technology Corporation, Danbury, Conn.

[21] Appl. No.: 447,049

[22] Filed: Dec. 7, 1989

[51] Int. Cl.$^5$ ................................. C08F 2/34
[52] U.S. Cl. ................................. 526/74; 526/216; 526/901
[58] Field of Search ..................... 526/74, 901, 216

[56] References Cited

U.S. PATENT DOCUMENTS 4,675,368  6/1987  Solvay et al. .
4,742,139  5/1988  Kioka et al. ................... 502/133

FOREIGN PATENT DOCUMENTS 0282929  9/1988  European Pat. Off. .

Primary Examiner—Joseph L. Schofer
Assistant Examiner—Tom Weber
Attorney, Agent, or Firm—Clement J. Vicari

[57] ABSTRACT

A method for inhibiting polymer build-up in a heat exchanger during the gas phase polymerization of alpha-olefins which comprises introducing upstream of the heat exchanger para ethyl ethoxybenzoate in an amount sufficient to inhibit polymer build-up.

10 Claims, 1 Drawing Sheet

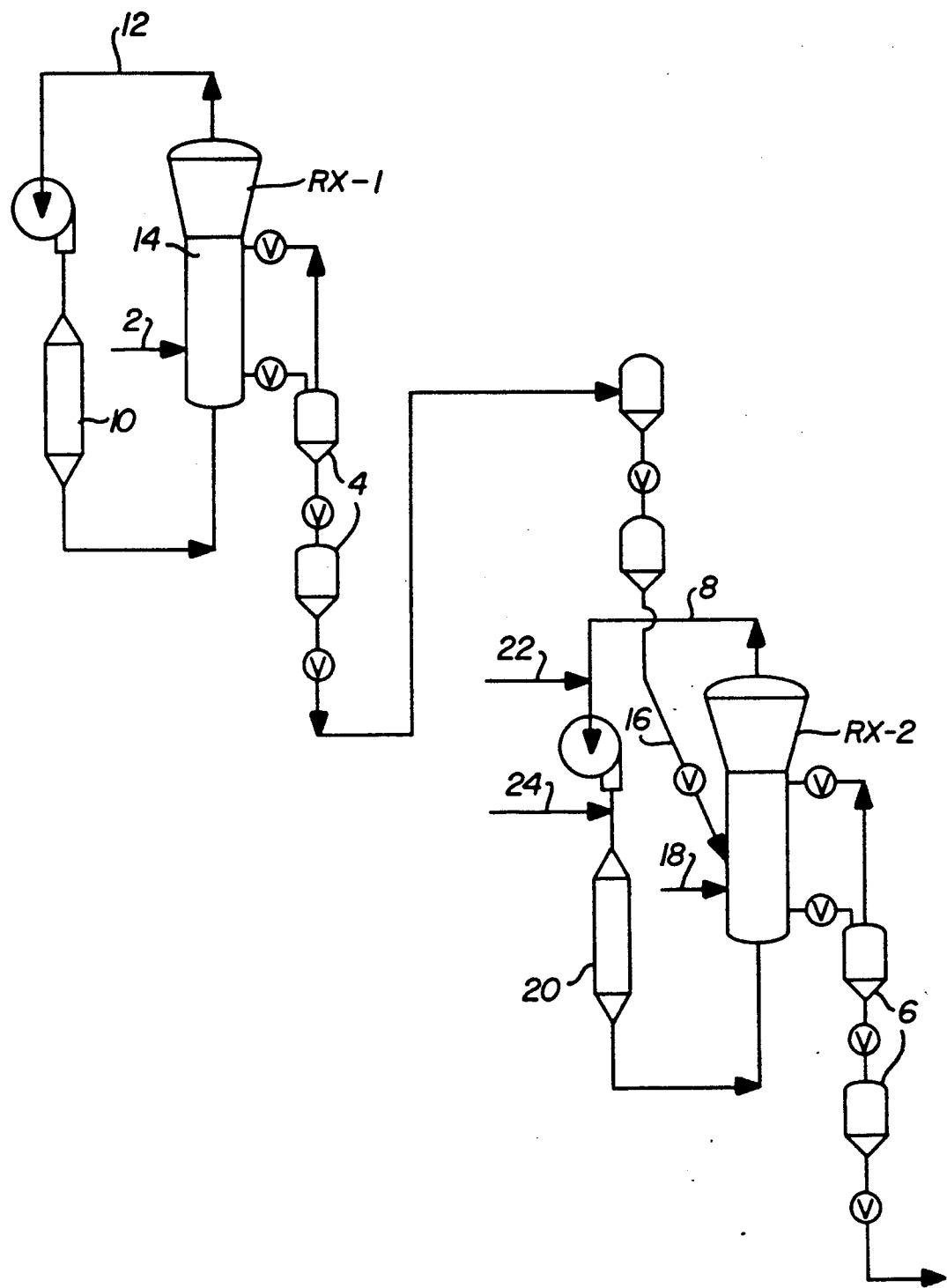

PROCESS FOR REDUCING POLYMER BUILD-UP IN HEAT EXCHANGERS DURING POLYMERIZATION OF ALPHA-OLEFINS

TECHNICAL FIELD

The invention relates to copolymerizing propylene and other alpha-olefins such as ethylene. More particularly, the present invention relates to a process for reducing the amount of heat exchanger fouling during copolymerization of propylene with alpha-olefins such as ethylene.

BACKGROUND OF THE INVENTION

Although the invention is herein described with reference to systems for copolymerization of propylene and ethylene, it will be understood that the invention can be readily applied to the copolymerization of other alpha-olefin monomer combinations such as propylene-butene, propylene-hexene and also terpolymer systems produced from three or more olefinic monomers.

"Propylene impact copolymers" are polymers which are composed of a polypropylene homopolymer phase which is intimately mixed with one or more ethylene-propylene copolymer phases. This mixture results in a product which has good impact resistance and good stiffness.

Impact copolymers are typically produced by two or more reactors in series. The first reactor typically produces polypropylene homopolymer which is then fed to a second reactor. Alternatively, the first reactor can be used to produce random copolymer which would then be fed to the second reactor. In the second reactor (and subsequent reactors, if any) the reactant composition is varied such that copolymers with varying fractions of ethylene and propylene are produced in each reactor and intimately mixed with the polymer from the previous reactors.

Typically, the reaction in the reactors, which can be gas phase reactors, is catalyzed by a transition metal catalyst. In most cases the transition metal is titanium.

In general, the equipment for producing propylene impact copolymers is conventional equipment such as two or more reactors, heat exchangers, compressors, discharge systems and piping connected to the various equipment.

Unfortunately, however, during normal operations, the surfaces of the tubes of the heat exchanger or cooler tend to foul with undesirable polymer deposits. These deposits tend to reduce the heat exchanger capability in cooling the recycled gas which removes the heat of reaction, and also it increases the pressure drop across the heat exchanger, which adds to the load on the cycle gas compressor. Because of increasing pressure drop and/or decreased heat exchanger capability the reactor must be shut down within a short time for cleaning.

According to EPA publication No. 0282929 there is disclosed a method for producing a Propylene-alpha-olefin block copolymer without polymer agglomeration in the reactor, by supplying at least one compound selected from the group consisting of an aromatic carboxylic acid ester, a phosphorous ester, an unsaturated dicarboxylic acid diester, amine compound and an amide compound, to the reactor or recycle line. The preferred carboxylic acid ester can be ethyl benzoate and ethyl ethoxybenzoate. Unfortunately however polymer build up in heat exchangers is still a problem when using the method disclosed in the EPA publication 0282929.

SUMMARY OF THE INVENTION

It has been found that by adding para ethylethoxybenzoate (PEEB) upstream of the heat exchanger, that the formation of polymer deposits in the heat exchanger can be reduced substantially.

Broadly contemplated therefore the present invention provides a method for inhibiting polymer build-up in a heat exchanger during the gas phase polymerization of alpha-olefins which comprises introducing upstream of the heat exchanger para ethyl ethoxybenzoate in an amount sufficient to inhibit polymer build-up.

BRIEF DESCRIPTION OF THE DRAWINGS

FIG. 1 illustrates a two-reactor polymerization system for producing polypropylene impact copolymers.

DESCRIPTION OF THE PREFERRED EMBODIMENTS

It is critical to the instant invention that the para ethylethoxybenzoate (PEEB, a commercially available material) be added to the recycle line upstream of the heat exchanger i.e., to the recycle line leaving the reactor. It is preferred however to introduce the para ethyl ethoxybenzoate either upstream of the compressor disposed in the upstream portions of the recycle line or into the compressor or between the compressor and the heat exchanger.

The amount of the para ethyl ethoxybenzoate used can vary over a range of about 5 to about 20 pounds of PEEB per million pounds of polymerized alpha olefins copolymer polypropylene produced. Use of lower amounts will be less effective in preventing polymer growth while use of larger amounts will adversely affect the operation of the reactor. Preferred amounts are within the range of about 6 to about 8 pounds per million pounds.

The preferred alpha olefins produced are polypropylene impact copolymers.

Referring to FIG. 1, two reactor systems of the type illustrated in FIG. 1 typically provide a catalyzed exothermic reaction (e.g., a fluidized bed 14) within a first reactor RX-1 for converting gaseous raw materials into solid product. Raw materials (such as propylene, ethylene, nitrogen, hydrogen, catalyst, cocatalyst and a selectivity control agent) are fed through an input stream 2 to the reaction system (RX-1). The heat of reaction is removed from the reactor RX-1 by circulating a stream of gaseous raw materials 12 through a cooler 10. Reaction temperature may be controlled by adjusting water flow in cooler 10 which removes heat from the circulating gas stream 12. Solid product, in the form of polypropylene homopolymer or random copolymer containing active catalyst, is removed from reactor (RX-1) by periodically discharging a small portion of the fluidized bed 14 into a product discharge system 4.

The second reactor (RX-2) of the two reactor system of FIG. 1 is designed to produce a copolymer of propylene and ethylene in intimate mixture with the solid homopolymer or random copolymer material produced by the first reactor (RX-1). In this embodiment, the product stream 16 from the first reactor (RX-1) (including e.g., homopolymer and active catalyst) is fed to the second reactor (RX-2). Raw materials (e.g., ethylene and propylene) are fed via input stream 18 to the second reactor (RX-2) to be polymerized by the still active catalyst in the homopolymer or random copolymer material within the reactor (RX-1) product stream 16.

In the second reactor (RX-2), ethylene and propylene are copolymerized in intimate mixture with the propylene homopolymer or random copolymer to produce impact copolymer. The process is maintained by the addition of ingredients from RX-1 and input stream 18 and cooling is provided by the circulation of the gaseous stream 8 through a cooler 20.

In the embodiment of FIG. 1, no catalyst is added to RX-2. The reaction within RX-2 is thus catalyzed entirely by catalyst contained in the polymer coming from RX-1.

Typical objectives for the operation of a second or subsequent reactor RX-2 in a multi-reactor chain process such as shown in FIG. 1 include maintaining prescribed values for the fraction (hereinafter called "$F_c$") of the final product (e.g., impact polypropylene) that is created in the second reactor and for the fraction (hereinafter called "$E_c$") of ethylene contained in the copolymer fraction which is produced in reactor RX-2.

$F_c$ (the fraction of total product that is created in the second reaction (RX-2) depends in general upon the combination of partial pressures of propylene ($C_3H_6$, hereinafter "C3") and ethylene ($C_2H_4$), hereinafter "C2") that exist in the reaction system RX-2. With some catalyst systems, however, catalyst or cocatalyst may be added to the second reactor to control $F_c$. $E_c$ (the fraction of ethylene that is incorporated in the copolymer produced in reactor RX-2) depends upon the relative partial pressures of ethylene and propylene.

During normal operations the internal surface of the tubes of the heat exchanger 20 in the second stage during production of ethylene-propylene copolymer products tend to foul with undesirable polymer deposits.

The benefits of the instant invention are obtained by introducing the para ethyl ethoxybenzoate upstream of the cooler e.g., cooler 20. The para ethyl ethoxybenzoate is thus introduced prior to the compressor through line 22 or to the compressor, or in between the compressor and cooler 20 through line 24. Addition of the para ethyl ethoxybenzoate in this manner provides dramatic relief from fouling.

The following examples will further illustrate the present invention.

EXAMPLE 1

This example illustrates the rate of fouling of the heat exchanger when no PEEB is fed to the impact copolymer reactor system.

Impact copolymer polypropylene was produced in powder form in two gas phase fluidized bed reactors operated in series. In the second reaction system, a gas phase consisting of nitrogen was circulated prior to starting the polymerization. The gas was circulated by a cycle gas compressor through the tube side of a conventional shell and tube heat exchanger where heat was removed from the system. The insides of the heat exchanger tubes were cleaned prior to conducting the polymerization by hydroblasting. Reaction was established by transferring homopolymer polypropylene containing active Ziegler-Natta polymerization catalyst from the first reactor to the second reactor; by feeding triethyl aluminum to the second reactor; and by establishing the proper concentration of ethylene, propylene, and hydrogen in the gas phase of the second reactor.

The triethyl aluminum feed rate and gas phase composition were adjusted to produce an impact copolymer product having an Ec (ethylene content of the copolymer) of approximately 60% and an Fc (fraction copolymer) of approximately 14%. At the beginning of the run, the heat exchanger pressure drop was approximately 1 psi.

The reactor was operated for a total of approximately 5.5 days producing impact copolymer with an Fc of approximately 14 to 17%, after which it was shut down. At the time of shutdown, the cooler pressure drop was approximately 3.5 psi. During the run, it had risen at rates of 0.3 to 0.7 psi/day.

Upon inspection, the cooler inlet had a rubbery build up. The inside surfaces of the heat exchanger tubes were coated with thin layers of rubbery polymer. Several tubes were plugged.

EXAMPLE 2

This Example demonstrates that feeding PEEB downstream of the heat exchanger does not eliminate polymer build up in the heat exchanger.

Prior to conducting the polymerization, the tube side of the heat exchanger described in Example 1 was cleaned by hydroblasting. The reactor was started up as in Example 1. Operating conditions were regulated to produce an impact copolymer product having an Ec of approximately 60% and an Fc of approximately 15%. After a short period of time, Para ethylethoxybenzoate (PEEB) was fed continuously to the cycle gas line downstream of the heat exchanger and upstream of the reactor at a rate of approximately 17 lb/million pounds of impact copolymer product. Feeding of PEEB was continued until the end of the run. At the beginining of the run, heat exchanger pressure drop was 1.3 psi. The run was continued for about 6 days after PEEB injection was started, producing impact copolymers with an Fc of 14 to 17%. The second reactor was then shut down in order to switch the plant to the production of homopolymer polypropylene. During most of the run, the heat exchanger pressure drop increased steadily at a rate of ¼ psi/day. At the end of the run, heat exchanger pressure drop had risen to 4.7 psi.

Upon inspection, the inlet tubesheet of the heat exchanger was found to have a heavy buildup of polymer. The inside surfaces of the heat exchanger tubes were coated with thick layers of loosely attached, rubbery polymer. Several tubes were plugged.

EXAMPLE 3

Impact copolymer polypropylene was produced in powder form in two gas phase fluidized bed reactors operated in series. In the second reaction system, a gas phase consisting of nitrogen was circulated prior to starting the polymerization. The gas was circulated by a cycle gas compressor through the tube side of a conventional shell and tube heat exchanger where heat was removed from the system. The insides of the heat exchanger tubes were cleaned prior to conducting the polymerization by hydroblasting and shell blasting to a smooth bare metal surface. No coating or treatment was applied. Four tubes were left uncleaned for comparison. Reaction was established by transferring homopolymer polypropylene containing active Ziegler-Natta polymerization catalyst from the first reactor to the second reactor; by feeding triethyl aluminum to the second reactor; and by establishing the proper concentration of ethylene, propylene, and hydrogen in the gas phase of the second reactor.

Triethylaluminum feed rate and gas phase composition were adjusted to produce an impact copolymer product having an Ec (ethylene content of the copolymer) of approximately 60% and an $F_c$ (fraction copolymer) of approximately 18%. At the beginning of the run, the heat exchanger pressure drop was 5.7 psi.

The reactor was operated for 9 days producing impact copolymer with an $F_c$ of about 18%, one day with an $F_c$ of about 21% and three days with an $F_c$ of about 14.5%.

After 13 days, the second reactor was shut down in order to switch the plant to the production of homopolymer polypropylene. At this time, the heat exchanger pressure drop had increased to 28 psi. The rate of pressure drop increase was 1.7 psi/day.

Upon inspection, the insides of the heat exchanger tubes were found to have thin continuous film of rubbery polymer that extended throughout each tube.

EXAMPLE 4

This Example demonstrates polymers growth reduction in the heat exchanger by selective addition of PEEB upstream of the heat exchanger and downstream of the compressor.

Prior to conducting the polymerization, the tube side of the heat exchanger of Example 3 was cleaned by hydroblasting followed by blasting with walnut shell. Half of the tubes in the heat exchanger were then treated with UCAR-AFL-40 (an amino silicone produced by Union Carbide Chemicals and Plastics Co., Inc.) by blowing a soaked squeegee through each tube first from one end, then from the other end. The remaining half of the tubes were left untreated.

The reactor was started up as in Example 3 and operating conditions were adjusted to produce initially an impact copolymer product having an Ec of approximately 60% and an Fc of approximately 21%. From the beginning of the run, paraethylethoxybenzoate (PEEB) was fed continuously to the cycle gas line downstream of the cycle gas compressor and upstream of the heat exchanger at a rate of approximately 7.4 lb/million pounds of impact copolymer product.

When the reactor running stabilized, the heat exchanger pressure drop was approximately 11 psi. The overall heat transfer coefficient at this time was approximately 180 BTU/hr. sq.ft.°F. The reactor was operated for 8 days producing 21% Fc impact copolymer, for 5.5 days producing 18% Fc impact copolymer, and for 17 days producing 14% Fc impact copolymer. At this time in the run, the heat exchanger pressure drop had decreased to approximately 6.8 psi and was not changing. The overall heat transfer coefficient had increased to approximately 215 BTU/hr. sq.ft.°F. and was not changing.

Near the end of the run at 14% Fc, PEEB flow was stopped. The reactor conditions were than changed to produce a 25% Fc impact copolymer. About 8 hours after the product change, heat exchanger pressure drop started to rise at a rate of 1.75 psi/day. After about 1½ days, PEEB flow was restarted. Heat exchanger pressure drop stopped rising within 4 hours, and slowly declined for the rest of the run.

Twenty-five percent Fc impact copolymer was produced for about 4 days. The second reactor was then shut down in order to switch the plant to the production of homopolymer polypropylene. At the end of the run, heat exchanger pressure drop was 8.6 psi. The overall heat transfer coefficient at this time was approximately 230 BTU/hr. sq.ft.°F. There had been no increase in pressure drop across the heat exchanger except then the PEEB flow upstream of the heat exchanger was stopped as a test, and the heat transfer coefficient actually increased slowly during the entire run.

Upon inspection, the inside surfaces of most of the heat exchanger tubes had a very thin polymer layer. There was no sign of the AFL-40 on the 50% of the tubes which had been treated prior to the run. There was no difference in the appearance of treated tubes and untreated tubes. It was not necessary to clean the heat exchanger prior to the next planned run.

What is claimed is:

1. A method for inhibiting polymer build-up in a heat exchanger during the gas phase polymerization of alpha-olefins which comprises introducing to the recycle line downstream of the reactor and upstream of the heat exchanger para ethyl ethoxybenzoate in an amount sufficient to inhibit polymer build-up.

2. A method according to claim 1 wherein said polymerized alpha-olefins are polypropylene impact copolymers.

3. A method according to claim 1 wherein the amount of ethyl ethoxybenzoate employed is in the range of about 5 to about 20 pounds of ethyl ethoxybenzoate per million pounds of polymerized alpha-olefins.

4. A method according to claim 1 wherein the amount of ethyl ethoxybenzoate employed is in the range of about 6 to about 8 pounds of ethyl ethoxybenzoate per million pounds of polymerized alpha-olefins.

5. A method according to claim 1 wherein a compressor is disposed upstream of said heat exchanger and wherein said ethyl ethoxybenzoate is introduced upstream of said compressor.

6. A method according to claim 1 wherein a compressor is disposed upstream of said heat exchanger and wherein said ethyl ethoxybenzoate is introduced into said compressor.

7. A method according to claim 1 wherein a compressor is disposed upstream of said heat exchanger and wherein said ethyl ethoxybenzoate is introduced between said compressor and said heat exchanger.

8. A method for inhibiting polymer build-up in a heat exchanger during the gas phase polmerization of alpha-olephins to form polypropylene impact copolymers which comprises introducing to the recycle line downstream of the reactor and upstream of said heat exchanger para ethyl ethoxybenzoate in an amount of about 5 to about 20 pounds of said ethyl ethoxybenzoate per million pounds of said polypropylene impact copolymers.

9. A method according to claim 8 wherein a compressor is disposed upstream of said heat exchanger and wherein said ethyl ethoxybenzoate is introduced into said compressor.

10. A method according to claim 8 wherein a compressor is disposed upstream of said heat exchanger and wherein said ethyl ethoxybenzoate is introduced between said compressor and said heat exchanger.

* * * * *